Dec. 31, 1968       R. T. NELSON       3,418,929
ENDLESS TYPE BAND AND METHOD OF MAKING SAME
Filed Oct. 13, 1967
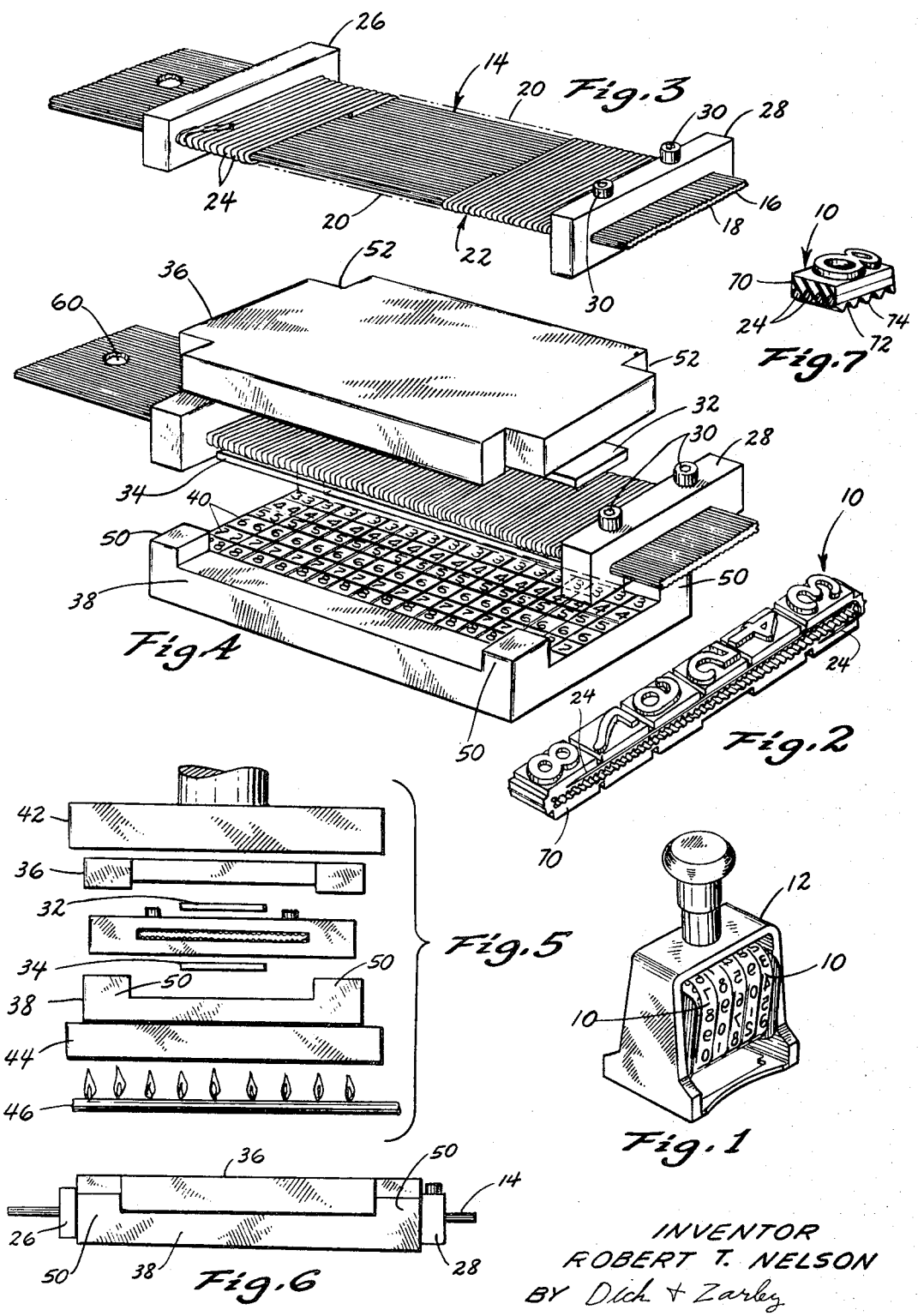
INVENTOR
ROBERT T. NELSON
BY Dick & Zarley
ATTORNEYS United States Patent Office 3,418,929
Patented Dec. 31, 1968

3,418,929
ENDLESS TYPE BAND AND METHOD
OF MAKING SAME
Robert T. Nelson, Ottumwa, Iowa, assignor to Lin-Den
Company, Ottumwa, Iowa, a corporation of Iowa
Continuation-in-part of application Ser. No. 428,655,
Jan. 28, 1965. This application Oct. 13, 1967, Ser.
No. 677,835
3 Claims. (Cl. 101—111)

ABSTRACT OF THE DISCLOSURE

The method of making an endless printing band wherein a flat plate mandrel having uniform parallel ridges and grooves formed over its substantial area is wound with a plurality of turns of cord material to extend transversely of the ridges and grooves, placing a sheet of rubber material on opposite sides of the mandrel over the cord windings, heating the assembled package and compressing the assembled package to force the rubber material between the turns of cord and into the indentations in the mandrel for embedding the rubber material, withdrawing the plate mandrel from the resulting unit along lines parallel to the grooves and indentations, and cutting the resulting unit along lines parallel to the turns of cord to provide a plurality of endless type bands.

---

This is a continuation-in-part application of copending application, Ser. No. 428,655 filed Jan. 28, 1965 entitled Endless Type Band and Method of Making Same, now abandoned.

Heretofore it has been common practice to mold a printing band in one long strip and then connect its ends together by vulcanizing the rubber. A major problem with this type of band has been that it is weak in the vulcanized joint area and eventually breaks there. For example, ink applied to the printing bands dries out the vulcanized area thereby weakening it and accordingly making it easy to fracture at this point.

Accordingly, it is one of the principal objects of this invention to provide a method of making an endless band having uniform strength throughout its entire length and free from objectionable weak joints.

A related object of this invention is to provide a method for making an endless type printing band which includes a minimum of components and steps.

A specific object of this invention is to provide a method for making an endless type printing band wherein rubber material may be forced between and under turns of cord material to thereby imbed the cord material in the band member and additionally provide the band member with an inner surface having high frictional gripping capability.

A still further object of this invention is to provide a method for making an endless type printing band wherein a length of cord is wrapped around a mandrel with the loops being in contiguous relationship and plastic rubber material is molded therearound but yet the mandrel may be easily removed after the molten rubber is set.

A further object of this invention is to provide an endless type band and method of making same which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of a price marker, one type of device which employs the endless type bands of this invention;

FIG. 2 is a perspective view of one of the endless type bands illustrated on the price marker in FIG. 1;

FIG. 3 is a fragmentary perspective view of the mandrel employed in the method of this invention wherein it is wrapped with a length of cord prior to having the rubber molded thereon;

FIG. 4 is an exploded view of the mold assembly with the mandrel in the center and rubber material on opposite sides thereof;

FIG. 5 is an exploded view from the end of the mold assembly illustrating the relative relationship of the components prior to the application of heat and pressure;

FIG. 6 is a side elevation view of the mold in its closed condition; and

FIG. 7 is a fragmentary perspective view of the endless band of FIG. 2 illustrating the cross-sectional configuration thereof.

The endless type band of this invention is referred to generally by the reference numeral 10 in FIG. 2 and is shown in FIG. 1 in use on a price marker device 12.

In making the band 10, a mandrel 14 is employed which is preferably of light weight sheet metal such as aluminum. Ridges and grooves 16 and 18 respectively are formed longitudinally on all surfaces of the mandrel 14 including the side edges 20. A length of cord 22 is wrapped around the mandrel transversely of its length. The turns of cord 24 are normally closely spaced relative to each other. At one end of the mandrel 14, a string stop sleeve element 26 slidably embraces the mandrel and is held in place by any suitable means such as a set screw or the like. At the other end of the mandrel 14 a removable string stop 28 similar to the string stop 26 is provided and readily accessible set screws 30 or the like are employed to permit easy removal of the sleeve-type member when necessary. The cord 22 is preferably of cotton material.

Next, a pair of plastic sheets, preferably rubber, 32 and 34 are placed on opposite sides of the mandrel against the turns 24 of the cord 22 as illustrated in FIG. 4. The assembled package of the two sheets of rubber 32 and 34 and the cord wrapped mandrel 14 are then placed in a mold comprising top and bottom sections 36 and 38. Each of the mold sections 36 and 38 are formed to mold a plurality of band elements 10 of the type illustrated in FIG. 2. Numeral impressions 40 are formed in the faces of the mold sections 36 and 38. The mold is then placed in a press having upper and lower halves 42 and 44. Inside the mold cavity the temperature is raised to approximately 300 degrees F. for eight minutes by application of heat from a burner 46 or the like. The pressure exerted by the press 42 and 46 is approximately 8,000 pounds per square inch.

As the rubber material 32 and 34 is heated it begins to flow under the pressure between the turns 24 and the cord 22 into the grooves 18 in the mandrel 14 thereby imbedding the cord 22 in the rubber material. The rubber flows laterally and over the side edges of the mandrel 14 to form an endless type band construction. The mold sections 36 and 38 are held in positive engagement with each other by corner shoulders 50 formed on the bottom mold section 38 which are received in mating corner notches 52 cut out of the top mold section 36.

After the temperature in the mold cavity has cooled and the rubber has set, the mandrel 14 may be removed by first sliding the detachable string stop 28 off the mandrel after set screws 30 have been loosened. Now a pulling device may engage the apertures 60 in the mandrel 14 and withdraw the mandrel from the molded length of continuous type band 10. This is made possible by the fact that the protrusions and indentations in the mandrel 14 are grooves and ridges 18 and 16 which will not obstruct the removal of the mandrel from the continuous sheet of molded band elements 10. Finally, the band elements are separated from each other by cutting along a score line extending between adjacent band elements 10.

As illustrated in FIGS. 2 and 7, it is seen that the molded type band 10 includes the rubber material 70 with transverse grooves and ridges 72 and 74 respectively. Also, the continuous turns of cord 22 are imbedded in the rubber 70 at the base of the grooves 74.

The structure illustrated is capable of producing six sets of bands, each set having five bands. The mandrel 14 is made of tool steel and is six and one-quarter inches long between the stops 26 and 28 and has a width of 2.050 inches and has a 0.0625 inch thickness. The grooves 18 on both sides are spaced apart 0.050 inch on center and are 0.017 inch deep. The rubber used is preferably natural rubber 50 durometer. The rubber sheets 32 and 34 are six and one-quarer inches long and one inch wide with a 0.125 inch thickness. The sheets of rubber 32 and 34 being narrower than the mandrel 14 results in eliminating the air pockets in the finished bands since the air is forced laterally outwardly under the pressure of the molds.

An alternate cord that may be used is three-ply dual duty nylon unbleached cord L3 in size available from the Coats and Clark's Sales Corporation, Atlanta, Georgia.

It is to be stressed that the cord is wrapped around the mandrel with no spacing between each loop of cord thereby providing a maximum number of loops in each single band. This generally is four to six loops to a band.

When the mold is in the vulcanizer press 42 and 44 the platens 42 and 44 are closed initially with very little pressure thereby pre-heating the mold for a period of 30 seconds to the temperature of 300 degrees F. Then the pressure is increased slowly until the total pressure of 8000 pounds per square inch or seven tons is applied to each mold. The pressure and temperature is then maintained for eight minutes. Next the mandrel is pulled and then the band is ready for trimming and cutting.

It is important to appreciate that the use of sheets of rubber material on the mandrel being wrapped with contiguous loops of cord and having longitudinally extneding ribs and grooves results in a uniform finished product having no air therein since the air is completely dissipated therefrom. The narrower sheets of rubber 32 and 34 are compressed through the abutting loops of cord and are also forced laterally outwardly. The air moves downwardly into the grooves and outwardly and thus out of the finished printing band. Moreover the ribs and grooves in the mandrel serve the two important functions of making it possible to imbed the windings of the cord in the rubber and then when the rubber has solidified to make it impossible to withdraw the mandrel without collapsing it or varying its width or changing its shape in any way because the mandrel will move parallel to the registering ridges and grooves in the mandrel and the finished printing band unit. It is not necessary to cut the bands while the unit is on the mandrel but may be conveniently done after the mandrel has been removed. The closely adjacent ribs and grooves in the finished bands provide a tread which gives excellent traction on any type of printing band wheel and is very important since all ink markers use fast drying inks which tend to stick to the band and to the wheel when not in use. If the band does not have these ridges and grooves then the wheel simply slips inside of the band. The resulting band of this invention is extremely strong and overcomes one of the major objections to conventional bands and that is when the ink dries the band freezes and then the band breaks when the freeze is broken.

It is thus seen that this invention provides a band element 10 of continuous structure having no joints which is almost unbreakable. Moreover, a simplified method of construction has been disclosed for forming the band elements 10.

Some changes may be made in the construction and arrangement of my endless type band and method of making same without departing from the real spirit and purpose of my invention, and it is my intention to cover by my claims, any modified forms of structure or use of mechanical equivalents which may be reasonably included within their scope.

I claim:

1. An endless type printing band, consisting substantially of an elongated endless rubber member having raised printing indicia on its outer surface and alternately contiguous transversely extending ridges and grooves on its inner surface along its substantial length, said inner surface including at least ten grooves and ridges each per inch and said ridges and grooves being susbtantially V-shaped in cross section, and a single length of non-metallic cord formed into loops extending the length of said band and arranged in substantially contiguous relationship and imbedded in said endless rubber member at a depth from its inner surface such that the adjacent surface of said cords extends substantially along the bottom of said grooves and the cumulative width of the said loops of cords in cross section being substantially equal to the cross-sectional width of said band.

2. The method of making endless type printing bands, comprising, taking a one piece rigid flat plate mandrel having uniform parallel longitudinally extending contiguous ridges and grooves formed thereon over its substantial area including its top and bottom surfaces and opposite side edges on the order of at least ten grooves and ridges each per inch and said ridges and grooves being substantially V-shaped in cross section, winding a single length of non-metallic cord material around said mandrel to form contiguous loops extending transversely over said ridges and grooves, placing a rubber plastic sheet material over each side of said cord wound mandrel, heating the assembled package and compressing the assembled package to force rubber plastic material between said loops of cord and into said grooves in said mandrel whereby said cord is imbedded in said rubber plastic material, withdrawing said mandrel along a line parallel to the ridges and grooves from the loops of cord which have been bonded to the plastic material by being imbedded therein, and cutting the resulting unit along lines parallel to said turns of cord to provide a plurality of endless type printing bands having ridges and grooves corresponding to those on said mandrel.

3. The method of claim 2 wherein said sheets of rubber plastic material are approximately one-half the width of said mandrel and substantially the length of said mandrel when placed in the center on opopsite sides thereof, and when said assembled package is heated and compressed said rubber plastic is forced laterally outwardly over the opposite side edges of the mandrel thereby removing air contained therein.

References Cited

UNITED STATES PATENTS

| 435,159 | 8/1890 | Smith | 101—111 |
| 685,474 | 10/1901 | Hill | 101—111 |
| 798,460 | 8/1905 | Scotford | 101—111 |
| 2,762,297 | 9/1956 | Baer | 101—111 X |

FOREIGN PATENTS 806,137  12/1958  Great Britain.

DAVID KLEIN, Primary Examiner.

U.S. Cl. X.R.

101—401.1; 156—140; 161—47, 123, 144; 264—159